Dec. 16, 1958

M. LONG ET AL 2,864,216

SAUSAGE CANNER

Filed Oct. 12, 1953

INVENTORS:
Marshall Long
Jack M. Miller
BY
ATTORNEY.

Dec. 16, 1958  M. LONG ET AL  2,864,216
SAUSAGE CANNER
Filed Oct. 12, 1953  6 Sheets-Sheet 3
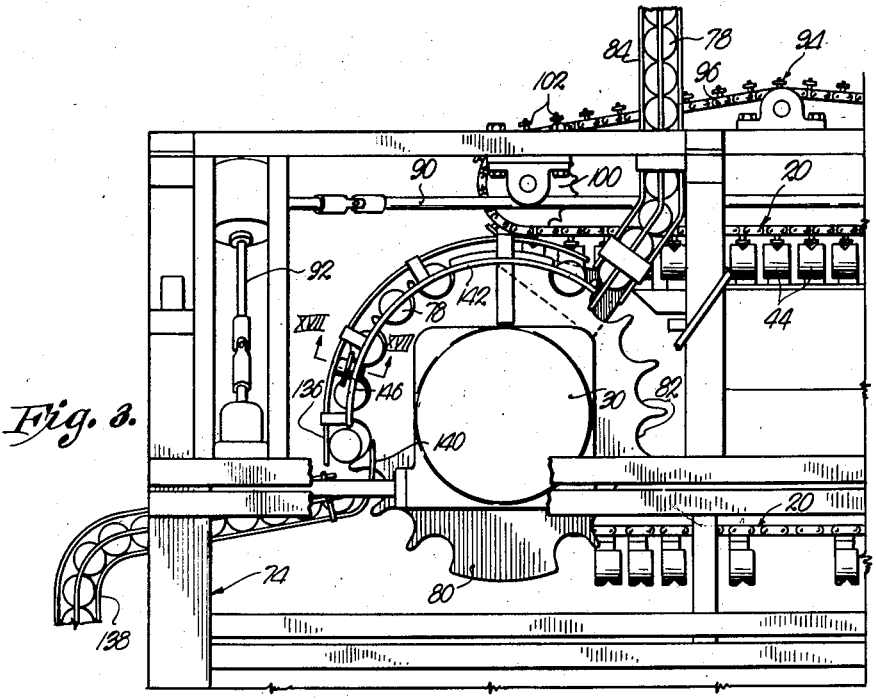
Fig. 3.
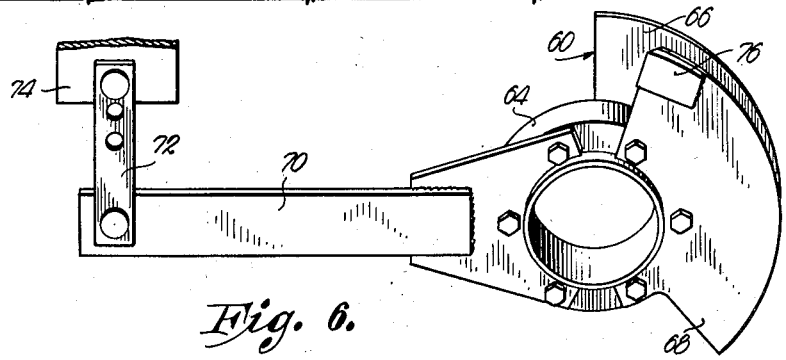
Fig. 6.
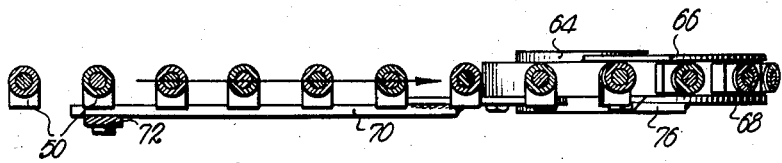
Fig. 7.
INVENTORS.
Marshall Long
Jack M. Miller
BY
ATTORNEY.

INVENTORS.
Marshall Long
Jack M. Miller
BY
ATTORNEY

INVENTORS.
Marshall Long
Jack M. Miller
BY
ATTORNEY.

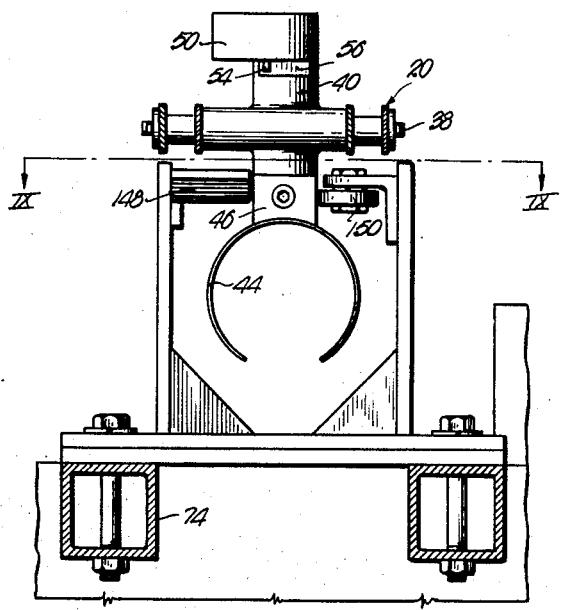
Fig. 8.
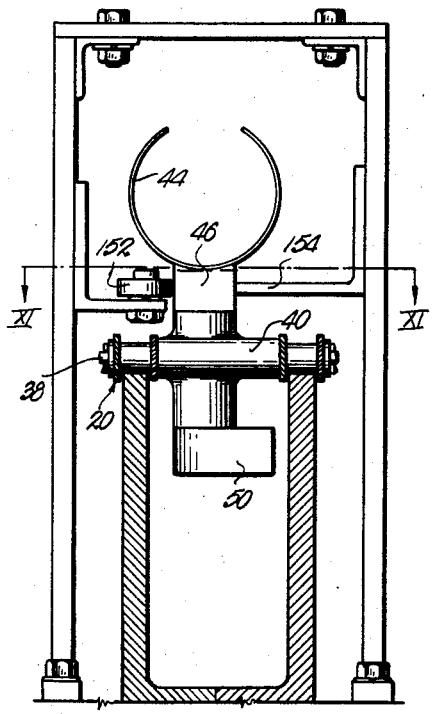
Fig. 10.
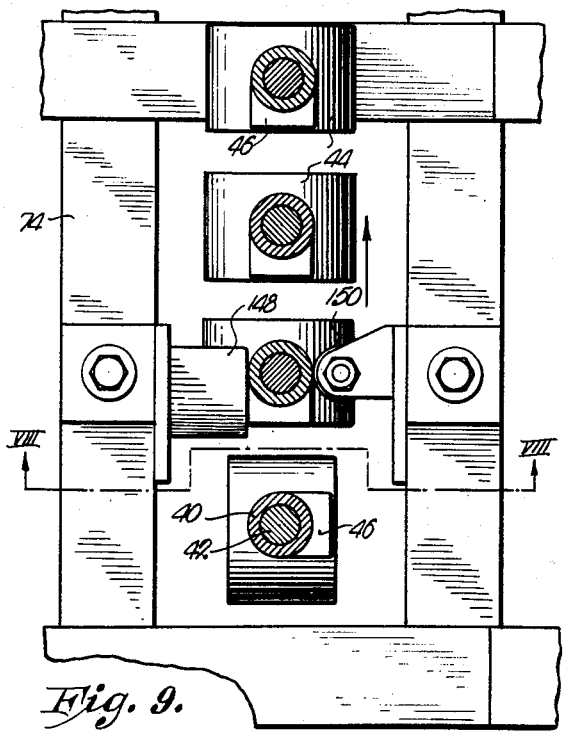
Fig. 9.
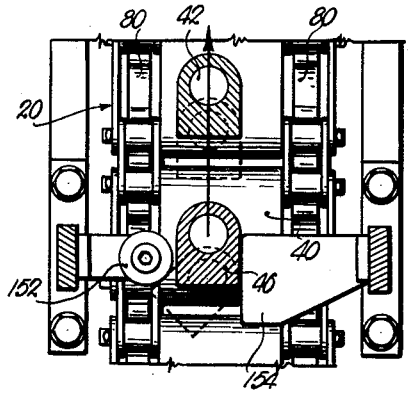
Fig. 11.
INVENTORS.
Marshall Long
Jack M. Miller
BY
ATTORNEY.

United States Patent Office 2,864,216
Patented Dec. 16, 1958

2,864,216
SAUSAGE CANNER

Marshall Long, Overland Park, Kans., and Jack M. Miller, Kansas City, Mo., assignors, by mesne assignments, to Marlen Equipment Corporation, Overland Park, Kans., a corporation of Missouri Application October 12, 1953, Serial No. 385,514

13 Claims. (Cl. 53—123)

This invention relates to a packaging or canning machine for packing elongated material such as Vienna sausages or similar meat products having a length initially longer than the combined height of a number of containers in which the same are packed after bunching and thereupon cutting into lengths substantially equal to the height of the container.

While the art of canning food products through use of automatic or semi-automatic equipment is rather highly developed, the field of sausage canners is relatively new and very few attempts have been made to solve the problems that are presented when an attempt is made to avoid the time-consuming operation of placing the individual sausages into cans by hand. We are aware of only two such machines, namely, those disclosed by Patents Nos. 2,048,156, of July 21, 1936, and 2,628,758, of February 17, 1953. The degree of success of such machines when placed in actual operation is not known, but the present invention has as one of its most important objects, the improvement upon the principles therein outlined.

It is the primary object of the present invention to improve upon the machines of said patents in an extremely important manner by eliminating intermittent or step-by-step operation made necessary by the arrangements therein disclosed and providing in lieu thereof, a sausage canner operable continuously and without interruption to receive the lengths of sausage, cut the same in predetermined lengths, eject the severed lengths into cans or other suitable containers, and direct the filled containers toward a point of closing, all without stopping any part of the machine or changing its speed of advancement.

As will hereinafter appear, the machine forming the subject matter of this invention embodies many advantageous features, each of which may be found to be old per se in the various arts. Nevertheless, all of the component parts of the machine have been brought together in a novel manner so that the elements cooperate with each other in overcoming the disadvantages of machines of this type heretofore developed and producing the new results which we have discovered, particularly with respect to the continuous and uninterrupted operation.

It is the most important object of the present invention to provide a sausage canner utilizing an endless conveyor that is driven continuously and provided with sausage-receiving holders so arranged as to permit cutting of the sausages therebetween and mounted for turning with respect to the conveyor into axial alignment with the containers to be filled, as well as with reciprocable plungers for ejecting the sausages into the containers, all operable in timed relationship with the conveyor so that no step-by-step movement is necessary.

Another important object of the present invention is to combine with the conveyor arrangement of the above-mentioned character, a helical knife rotatable continuously and driven in timed relationship with the conveyor to cut the sausages between the holders while the conveyor is advanced, all to the end that while one series of holders is being charged with sausages, another series is being severed and still another series of severed sausages is being ejected into the containers therefor.

A further important object of the present invention relates to novel arrangements of parts which includes turning of the holders into axial alignment with the containers, ejecting the severed sausages from the holders into the containers and reindexing the holders to positions in axial alignment, all while the holders advance around one of the supporting sprocket wheels for the conveyor so that the holders may be positioned relatively close together, thereby reducing the overall length of the machine and presenting a relatively inexpensive, neat, compact and positively operating assembly.

A still further object of the present invention is to provide in a machine of the aforementioned type, novel hold-down means engageable with the sausage lengths in the holders while the same are being severed by the helical knife to avoid misalignment of the sausages and to assure that the severed lengths will all be substantially equal in length to the height of the can.

Other objects include many important details of construction including the way in which means is provided to initially shift the cans over the proximal ends of the sausages prior to operation of the ejector plungers so that the sausage ends will not flare and likely catch upon the open edges of the cans; the way in which the holders are turned and held in positive alignment with the containers and the plungers by spaced-apart guide plates at the axis of rotation of one of the conveyor supporting sprocket wheels; the way in which the holders are reindexed and subsequently realigned through use of lateral lugs on the rotatable holders; and the manner in which severed ends of the sausages are cleared of the conveyor and the holders by blasts of fluid directed thereagainst.

In the drawings:

Fig. 3 is a fragmentary, elevational view of a portion of the opposite side of the machine adjacent the packing station.

Fig. 6 is a fragmentary, perspective view showing the spaced, arcuate plates of Fig. 5 utilized to turn the holders 90° and hold the same in axial alignment with the cans and the ejector plungers.

Fig. 7 is a schematic view taken through the pivot pins of the holders and illustrating the operation of the structure shown in Fig. 6 in turning the holders 90° immediately prior to charging of the cans with the sausage lengths carried by the holders.

Fig. 8 is an enlarged view taken below the sprocket wheel support shown in Fig. 5 looking in the direction of the arrow of Fig. 5 toward the rear of the machine and illustrating the reindexing means for the holders taken on irregular line VIII—VIII of Fig. 9.

Fig. 9 is a fragmentary, cross-sectional view taken on line IX—IX of Fig. 8 and looking downwardly as indicated by the arrows in Fig. 8.

Fig. 10 is an enlarged, fragmentary, cross-sectional view taken on line X—X of Fig. 2.

Fig. 11 is a fragmentary, cross-sectional view taken on line XI—XI of Fig. 10.

Fig. 12 is an enlarged, cross-sectional view taken on line XII—XII of Fig. 13.

Fig. 13 is a fragmentary, side elevational view of the upper stretch of the conveyor showing one of the sausage holders, parts being broken away for clearness.

Fig. 14 is a cross-sectional view taken on irregular line XIV—XIV of Fig. 13, parts being broken away to reveal details of construction.

Fig. 16 is a top plan view of the can back-up means shown in Fig. 3, illustrating the same prior to bending in the arcuate configuration shown in Fig. 3.

Figure 2:
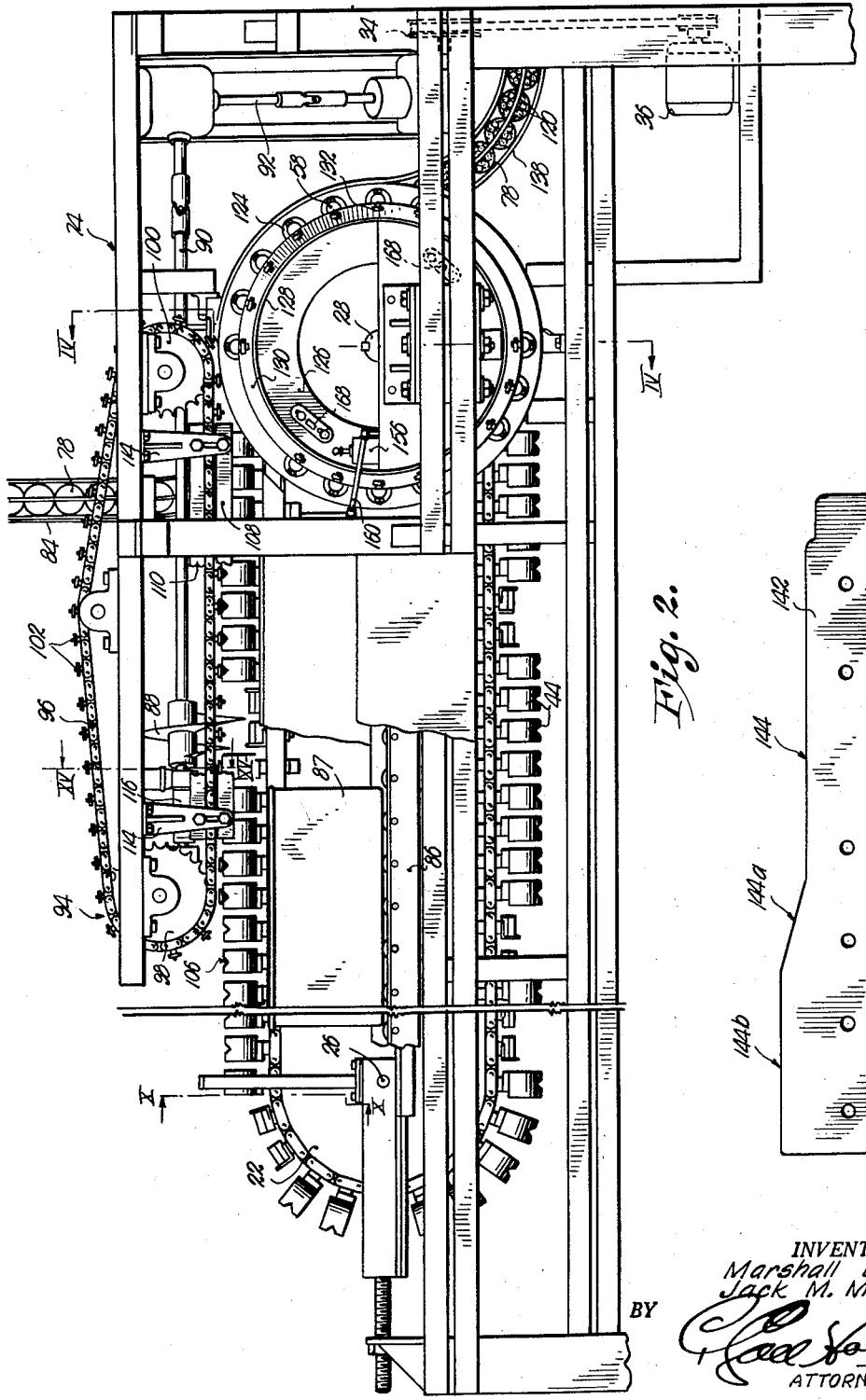
Fig. 2 is a side elevational view thereof, parts being broken away for clearness.
Figure 4:
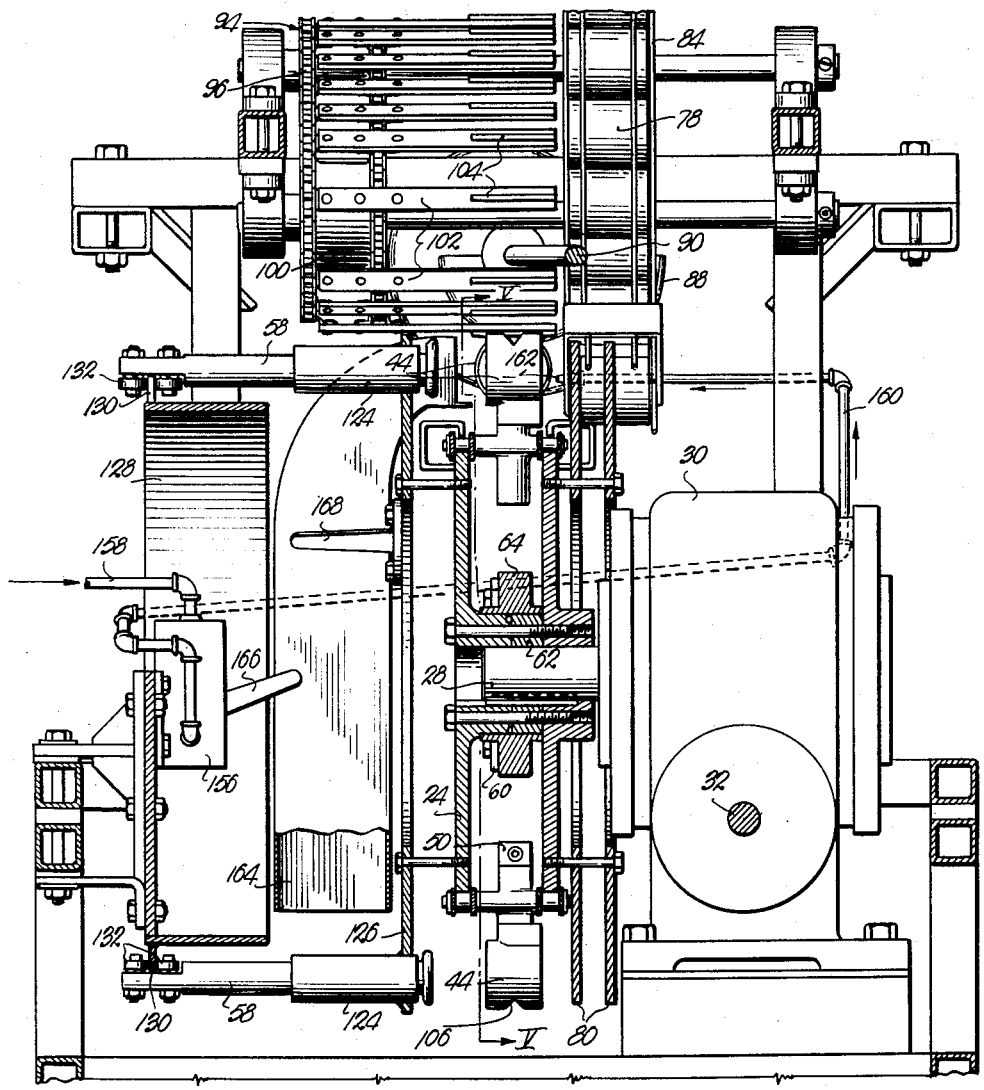
Fig. 4 is a fragmentary, enlarged, vertical, cross-sectional view taken on line IV—IV of Fig. 2.

An endless conveyor, broadly designated by the numeral 20, is mounted for continuous advancement and trained around a pair of sprocket wheels 22 and 24 rotatable on spaced, horizontal axes 26 and 28 respectively. As shown in Fig. 4, axis 28 extends from a gear box 30 that is in turn provided with a drive shaft 32 having a pulley 34 thereon as shown in Fig. 2 that is in turn operably coupled with a prime mover 36.

Conveyor 20 consists of a pair of spaced chains as shown in Figs. 4, 8 and 10 to 12 inclusive, pivotally interconnected by cross pins 38 extending through a plurality of blocks 40 as shown in Figs. 12 to 14 inclusive. Each block 40 has a pivot pin 42 extending therethrough oppositely to the pins 38 and upon which is rigidly mounted a substantially C-shaped sausage holder 44 that is open at its top when the holder 44 is advancing along the uppermost stretch of the conveyor 20. The open end holders 44 are each rigid to a lug 46 mounted on the pin 42 by a setscrew 48 and extending laterally or radially therefrom. A second lug 50 secured to the opposite end of the pin 42 by a setscrew 52 also extends radially outwardly from the pin 42 and is offset 90° relative to the lug 46.

The two lugs 46 and 50 therefore, hold the pin 42 against longitudinal movement with respect to the block 40, yet permit free pivotal movement thereof, together with the holder 44 with respect to the conveyor 20. Swinging movement of the holders 44 is limited to 90° by a pin 54 on the lug 50 riding within a slot 56 formed in the block 40. As seen best in Fig. 2 of the drawings, the holders 44 are arranged in a number of spaced series, there being eight holders 44 in each series respectively corresponding to eight ejector plungers 58 (Fig. 4) hereinafter more fully described. By virtue of the fact that the conveyor 20 is composed of a pair of spaced chains as above indicated, the sprocket wheels 22 and 24 are likewise of double character as illustrated best in Fig. 4 of the drawings.

The holders 44 are normally in axial alignment relatively and with the travel of the conveyor 20, but are turned 90° successively to positions axially thereof transversely of the conveyor 20 as they commence advancing around the sprocket wheel 24 through turning means broadly designated by the numeral 60 shown in Figs. 4 to 7 inclusive.

Hub 62 of sprocket wheel 24 loosely receives a band 64 between the two sprocket wheel sections thereof as shown in Fig. 4, band 64 in turn having a pair of spaced, arcuate plates 66 and 68 secured rigidly thereto (see Fig. 6).

As shown in Fig. 6, band 64 is held against rotation with the sprocket wheel 24 and held with the plates 66 and 68 properly adjusted by an arm 70 extending radially and rearwardly therefrom, together with an adjusting link 72 pivotally interconnecting the arm 70 and frame 74 of the machine, which frame 74 supports all of the operative mechanism of the machine including the parts heretofore described.

Figure 5:
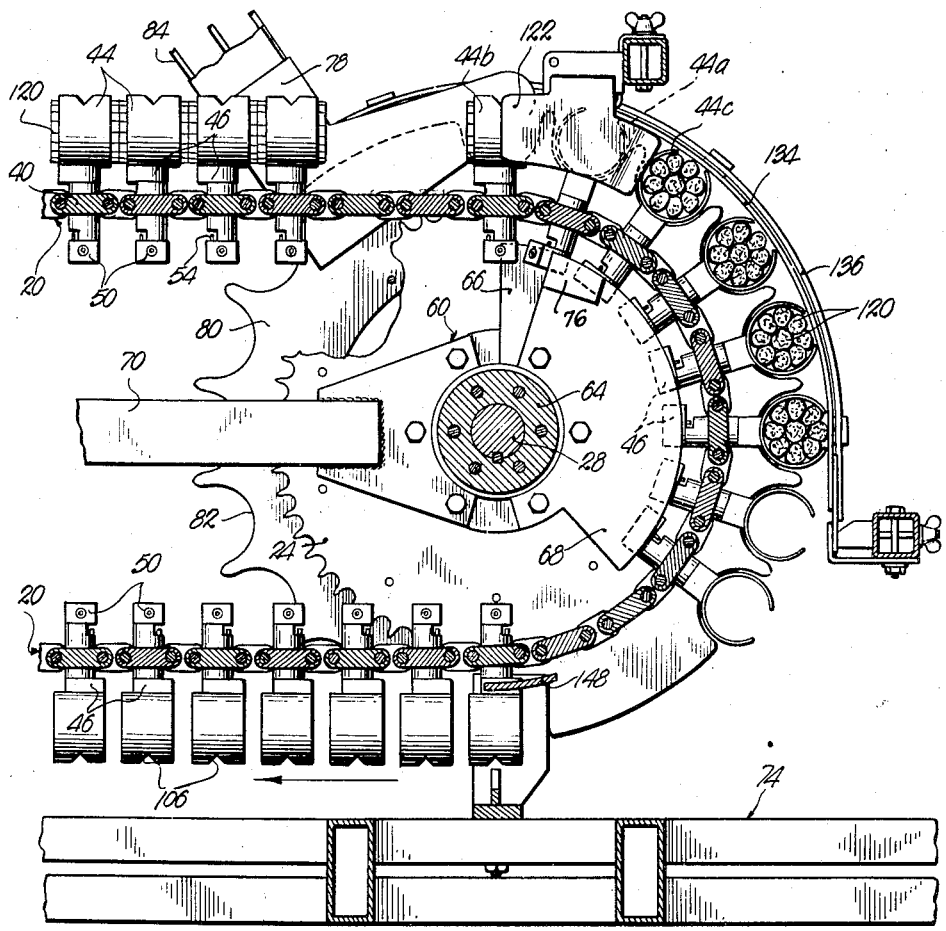
Fig. 5 is a fragmentary, cross-sectional view taken on line V—V of Fig. 4.

When the holders 44 are in alignment and traveling along the uppermost stretch of the conveyor 20, the lugs 50 extend transversely of the conveyor 20 as shown in Fig. 14 and therefore, in a position where the same will strike the plate 68 as may be seen in Fig. 5 of the drawings. Fig. 7 also illustrates the way in which the laterally extending lugs 50 move into engagement with the rearmost edge of the plate 68 adjacent its uppermost arcuate edge, and in Fig. 5, holder 44a is shown partially turned, whereas the next following holder 44b still has its axis in alignment with the travel of conveyor 20, and the next preceding holder 44c has completely turned to a position where its axis is transverse to the line of travel of the conveyor 20.

Plate 68 is reinforced with a block 76 at the point of contact by lugs 50 as shown in Fig. 6. The point at which turning movement of the holders 44 occurs may be adjusted by varying the position of link 72 with respect to frame 74. It is now notable also, that after the holders 44 have been turned to the position of holder 44c, as shown in Fig. 5, the lugs 50 will ride between the plates 66 and 68 of turning means 60, and the holders 44 will be held in such position for a predetermined time as the holders 44 advance around the sprocket wheel 24.

Therefore, throughout the time holders 44 are thus turned, they are positively held in direct alignment with the corresponding plungers 58 and with cans 78 being advanced therewith by means of a double-plated spider 80 as shown best in Figs. 3, 4 and 5. Each of the plates of spider 80 is provided with two diametrically opposed sets of can-receiving recesses 82 (see Figs. 3 and 5), each set of which is composed of eight of such recesses 82 corresponding to the eight plungers 58 and the eight holders 44 of each series thereof respectively. Spider 80 is connected directly to the sprocket wheel 24 for rotation therewith through bolt means as shown in Fig. 4 of the drawings and receives the cans 78 successively as the same gravitate from a source of supply not shown, along a chute 84 shown in Figs. 1 to 5 inclusive.

It is now believed apparent that since the holders 44 are all in alignment as they travel along the uppermost stretch of conveyor 20 from sprocket wheel 22 toward the sprocket wheel 24, they may be charged with sausages having lengths longer than the height of the cans 78 and in one manner of loading the holders 44 a plurality of such sausages slightly greater in length than a series of eight holders 44, may be laid in the eight holders immediately after the same have advanced upwardly around the sprocket wheel 22. To this end there is provided a pair of opposed roller platforms 86 for receiving trays 87 of the sausages and the operators may position themselves adjacent the platforms 86 in order to continuously bunch the sausages into the successive series of holders 44. Alternately, sausages of much greater lengths may be continuously fed to the holders 44 at that end of the machine adjacent sprocket wheel 22 through automatic feeding mechanisms not herein shown.

The sausages are thereupon cut as the conveyor 20 continues to advance the same toward the sprocket wheel 24 by a revolvable helical knife 88 disposed above the conveyor 20 intermediate the ends thereof, it being noted that knife 88 is mounted on a shaft 90 that is inclined horizontally with respect to the travel of conveyor 20. Knife 88 is, therefore, disposed to cut the sausages between the holders 44 at right-angles to their longitudinal axes to proper lengths for introduction lengthwise into the containers 78. Shaft 90 and, therefore, knife 88, are driven in timed relationship to the conveyor 20 by a shaft 92 coupling the shafts 32 and 90 as shown in Fig. 2.

It is to be pointed out that the sausages initially placed in the holders 44, and subsequently severed by the knife 88, are inherently slippery and therefore, must be held positively within the holders 44 at the time of severance to prevent their becoming misaligned and therefore, to assure that the severed sausages are all of the same length and cut substantially at right-angles to their longitudinal axes. To this end, therefore, there is provided a hold-down assembly broadly designated by the numeral 94 and shown in Figs. 1 to 4 inclusive, and 15.

Assembly 94 includes a double-chain, endless conveyor 96 trained around spaced sprocket wheels 98 and 100 above the conveyor 20 and rotatable on horizontal axes. Conveyor 96 has a plurality of spaced, laterally extending pressure bars 102 provided with lugs 104 on the ends thereof as best seen in Fig. 15.

Pressure bars 102 are arranged so that the lugs 104 engage the sausages within the holders 44 as the bars 102 travel along the lower stretch of the conveyor 96, it being noted that conveyor 96 travels oppositely to the conveyor 20.

V-shaped notches 106 are provided in the holders 44 for receiving the lugs 104 and, as shown in Fig. 2, the spacing between the bars 102 is the same as between the holders 44 so that the sausages are held down by a plurality pressure bars 102 throughout the lengths of the sausages and throughout the time the same are being severed by the knife 88. In fact, the lowermost stretch of the conveyor 96 is sufficiently long to hold the sausages in place until the holders 44 commence rotating by virtue of the action of turning means 60.

Figure 15:
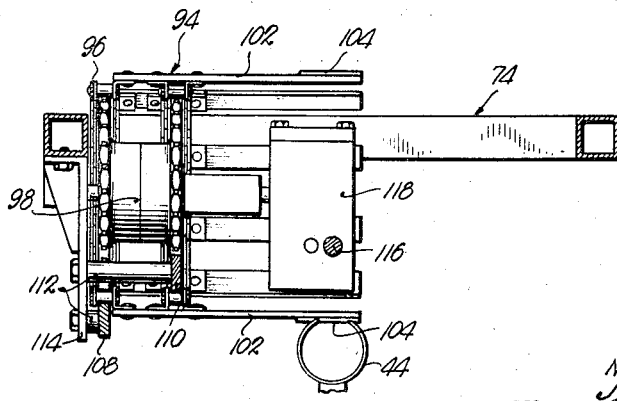
Fig. 15 is an enlarged, fragmentary, cross-sectional view taken on line XV—XV of Fig. 2.

The bars 102 of the hold-down assembly 94 are held with the lugs 104 thereof in pressing relationship to the sausages within holder 44, through use of a pair of longitudinal guide bars 108 and 110 as shown in Figs. 2 and 15, disposed to receive the lowermost stretch of conveyor 96. The bar 108 at one end of the bars 102 opposite to lugs 104, is disposed beneath the lowermost stretch of one of the chains of conveyor 96 and the other bar 110 overlies the other chain which is intermediate the ends of bars 102. The heights of bars 108 and 110 may be varied by spacer supports 112 adjustable within brackets 114 (Fig. 2) mounted on frame 74.

The hold-down assembly 94 is driven in timed relationship to the conveyor 20 by a shaft 116 continuing from the shaft 90 through a gear box 118 operably coupled with the sprocket wheel 98.

Avoidance of displacement of the severed sausages after the same move from beneath the hold-down assembly 94, and at the time of rotation of the holders 44 with the sausage lengths 120 carried thereby, is accomplished by a plate 122 mounted alongside the holders 44 directly above the block 76 of plate 68 as shown in Fig. 5 of the drawings. Centrifugal force which would otherwise tend to sling the sausages 120 from the holders 44 as the holders 44 are rotated by the turning means 60, is thereby prevented by the plate 122.

Figure 1:
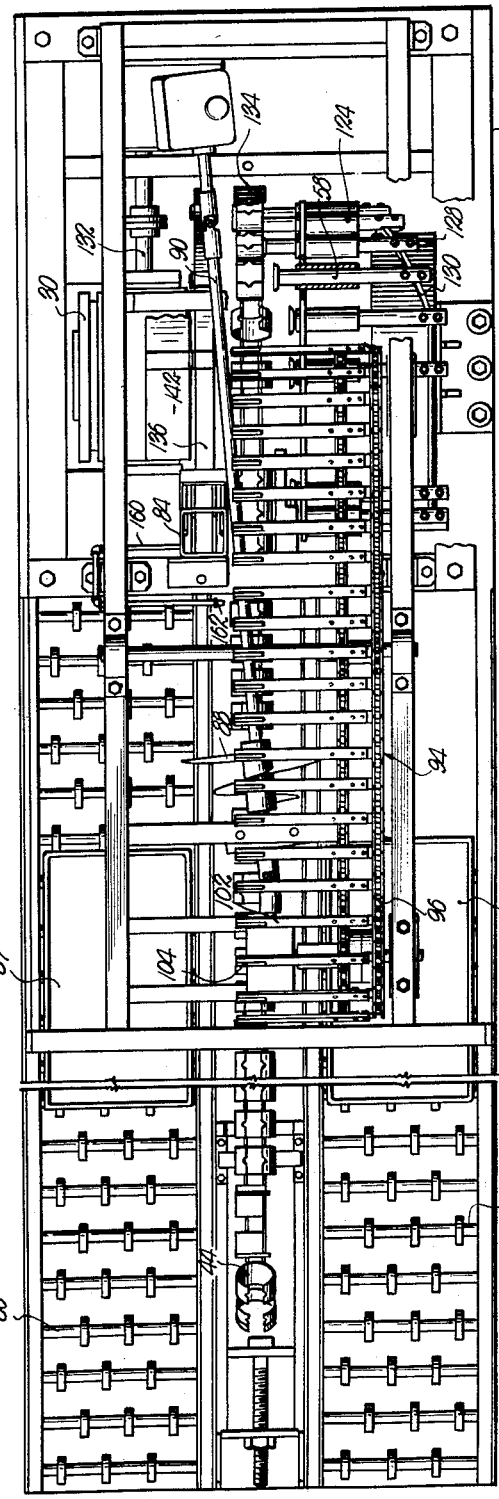
Figure 1 is a top plan view of a sausage canner made pursuant to the present invention, parts being broken away to reveal details of construction.

The eight plungers 58 above referred to and shown in Figs. 1, 2 and 4, are reciprocably mounted for movement on axes parallel with the axis of rotation of sprocket wheel 24 and carried by tubes 124 rigid to a turret ring 126. Turret 126 is secured to the sprocket wheel 24 for rotation therewith and the tubes 124, as well as the plungers 58, are arranged in an arcuate series concentric with the axis 28 of sprocket wheel 24.

A rigidly mounted band 128 spaced outwardly beyond the turret 126 in axial alignment with the axis 28, has a continuous cam track 130 mounted thereon. Plungers 58 are provided with rollers 132 engaging the track 130 and the latter is disposed on the band 128 as shown in Fig. 1 to progressively shift the plungers 58 in the tubes 124 toward the holders 44 as they advance around the sprocket wheel 24 and to retract the plunger 58 from within the holders 44 prior to the time the latter commence traveling along the lowermost stretch of conveyor 20.

Arcuate, adjustable keepers 134 and 136 are provided for the holders 44 and the spider 80 respectively to hold the sausages 120 within the holders 44 and to hold the cans 78 within the recesses 82 of spider 80 as the sausages 120 and the cans 78 advance around the axis 28 (see Figs. 1, 2, 3 and 5). Keeper 136 for cans 78 terminates sufficiently short as shown in Fig. 3 to permit the cans 78 and their contents of sausages 120 to gravitate to a chute 138 having an upwardly extending finger 140 to eject the cans from the recesses 82 and guide the same to the chute 138.

An arcuate, back-up strip 142 (Figs. 3, 16 and 17) is also provided for the cans 78 to hold the same against lateral displacement from the spider 80 as the plungers 58 extend into the holders 44 and eject the sausages 120 therefrom and into the cans 78 successively and continuously during operation of the machine.

Figure 17:
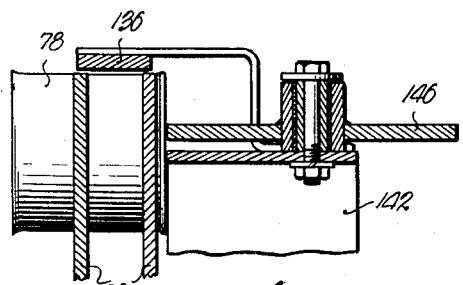
Fig. 17 is an enlarged, fragmentary, detailed, cross-sectional view taken on line XVII—XVII of Fig. 3.

Strip 142 continues from the chute 84 downwardly and forwardly toward the chute 138 as seen in Fig. 3, and is provided with an edge 144 shaped as shown in Fig. 16 against which the bottoms of the cans 78 engage as illustrated in Fig. 17. As the cans 78 move along the edge 144 and approach the position where plungers 58 commence ejecting the sausages 120 from the holders 44, the bottoms of the cans 78 engage an inclined portion 144a of the strip 142, causing the cans to move transversely of the spider 80 within the recesses 82, toward the holders 44 and over the ends of the sausages 120 that project from the holders 44. Thus, the cans 78 are partially threaded over the sausages 120 prior to the time that the latter are ejected by the plungers 58, thereby assuring that the sausages 120 are "started" properly into the cans 78. Inasmuch as the ends of the sausages 120 opposite to the plungers 58 would have a tendency to flare outwardly as soon as they commenced moving from within the holders 44, in the absence of the particular type of cam back-up means 142 herein provided, there would be a tendency for the sausages to catch on the open ends of the cans 78 and thereby cause difficulty in operation.

In order to reduce friction and to assure that the cans 78 will advance to sliding engagement with each portion 144b of strip 142, there is provided a roller 146 on the strip 142 for receiving the bottoms of the cans 78 as shown in Figs. 3 and 17.

After the plungers 58 have retracted from within the holders 44, and while the holders 44 are still advancing around the sprocket 24, holders 44 are reindexed through use of the lugs 46 in the manner illustrated by Figs. 5, 8 and 9 of the drawings. The reindexer is disposed immediately below the axis 28 as shown in Fig. 5, and includes a pair of opposed abutments 148 and 150. The abutment 150 is in the nature of a roller and is directly within the path of travel of the lugs 46, whereas the abutment 148 is disposed to limit the extent of swinging movement of the lug 46 as shown in Fig. 9 of the drawings. Consequently, the holders 44 are repositioned in axial alignment prior to the time the same advance along the lower stretch of conveyor 20.

However, there may be a tendency for the holders 44 to become slightly misaligned prior to the time of charging with sausages from the trays 87 and, therefore, there is provided a second pair of abutments 152 and 154 disposed to receive the lugs 46 therebetween as illustrated clearly in Figs. 10 and 11 of the drawings. The abutment 152 is preferably in the nature of a roller and the second reindexing means of Figs. 10 and 11 is located directly above the axis 26 of sprocket wheel 22 as shown in Figs. 1 and 2 of the drawings.

Inasmuch as the present machine has been designed particularly to receive a plurality of sausages of predetermined lengths slightly longer than each series of holders 44, the ends of such sausages will be severed by the knife 88 at each end respectively of the holder series and, therefore, means is provided to continually clear the machine, particularly conveyor 20 and holders 44 of such severed ends. A source of air or other fluid under pressure is directed to a valve 156 by way of a pipe 158 as shown in Fig. 4 of the drawings, and when the valve 156 mounted within the band 128 is open, the air blast is directed through a line 160 to a nozzle 162 disposed to force the severed ends of the sausages into a chute 164 for collection below the machine. Valve 156 is provided with an actuator 166 that is operated during each onehalf revolution of the turret 126 by lateral projections 168 mounted thereon to engage the actuator 166.

It is now seen that the arrangement of parts herein provided all coupled and synchronized in timed relationship with the travel of conveyor 20, permits for continuous operation and eliminates entirely any intermittent or step-by-step movement heretofore required in machines previously developed for this purpose and particularly those of the two patents above mentioned.

In the Gardner Patent No. 2,048,156, the arrangement of cutter knives shiftable to and from a position for severing the sausage lengths made it necessary to stop the conveyor each time the knives were placed in operation and while the Gannon Patent No. 2,628,758, provided for severance while the conveyors advanced, the provision of successive, offset packing stations did not eliminate the necessity of step-by-step movement.

It is recognized that revolvable, helical knives have previously been used to sever continuously advancing elongated articles, as for example in Patent No. 1,510,729 of October 7, 1924.

We also recognize that the canning industry has employed turrets and plungers, together with can feeding means similar in some respects to that hereinabove described, as for example Patent No. 2,578,833, of December 18, 1951. The hold-down assembly 94 of the present invention is utilized for an altogether different purpose than structures of this nature previously disclosed, and we recognize the teachings of Patent No. 2,518,223, of August 8, 1950, providing for an endless conveyor having means to compress products into open top containers.

Notwithstanding the teachings of the prior art, it is manifest that many advantageous features have been combined to provide for continuous operation and it has been found that the machine will operate over long periods of time without difficulty and without interruption because of the many factors included to prevent break-down. Successful operation is due in a large part to maintaining the holders 44 in axial alignment at all times except as they advance around the sprocket wheel 24. All turning of the holders 44 takes place at that point where the holders 44 are spaced sufficiently apart to permit the 90° turning movement. The knife 88 presents a relatively thin line of severance and, therefore, the proximal cut ends of the sausages 120 are relatively close together as they travel from the knife 88 along the uppermost stretch of conveyor 20 to the sprocket wheel 24. When, however, the holders 44 commence advancement around the sprocket wheel 24, they separate and therefore, spread the proximal cut ends of the sausages 120 sufficiently to permit the rotation thereof by the turning assembly 60. Likewise, the holders 44 are reindexed by the structure shown in Figs. 8 and 9 while the holders are still spread apart and capable of being so turned. At all other times from the reindexing means of Figs. 8 and 9, along the lower stretch of conveyor 20 and along the upper stretch thereof, the holders 44 are too close together to permit rotation.

The machine may be operated at a speed to suit the desires of the user or those employed to charge the holders with the initial sausage lengths. So far as we are aware no other machine is capable of properly canning food products of this type at speeds equivalent to the present invention.

Having thus described the invention what is claimed as new and desired to be secured by Letters Patent is:

1. A machine for packing sausages, initially longer than the combined height of a number of cans to be packed therewith, said machine comprising a pair of sprocket wheels mounted for rotation on spaced, horizontal axes; an endless conveyor trained around said wheels; a number of series of spaced, open top holders pivotally mounted on the conveyor and normally disposed in axial alignment with respect to the travel of the conveyor for receiving said sausages; a laterally extending lug for each holder respectively and having means attaching the same thereto; means for continuously driving the wheels to advance the conveyor, holders and sausages carried by the latter; a revolvable, helical knife driven in timed relation with the conveyor thereabove and having its axis inclined horizontally with respect to said travel of the conveyor, said knife being disposed to sever the sausages between the holders as the same advance from one of said wheels toward the other wheel; a spider secured to said other wheel for rotation therewith and having means for receiving said cans to be packed; means for feeding said cans successively to said spider; mechanism adjacent the spider and said other wheel for turning the holders successively as the same commence movement around the one wheel into alignment axially with the cans carried by the spider and transversely of the conveyor; a turret secured to said other wheel for rotation therewith; a plurality of shiftable plungers mounted on the turret; means for successively shifting the plungers into and out of the holders in timed relation with the conveyor to eject the severed sausages therefrom and into the cans; and reindexing means adjacent the one spider and said other wheel for turning the holders into axial alignment successively while the holders are still moving around the other wheel and after the plungers have been retracted from therewithin, said mechanism including a pair of spaced plates adjacent the other wheel for receiving the lugs whereby to hold the holders aligned with the cans and the plungers for a predetermined time prior to reaching the reindexing means.

2. A machine for packing sausages as set forth in claim 1 wherein each holder is provided with a second lug, said reindexing means including a pair of spaced abutments disposed for engagement by the second lugs as the holders advance from said plungers toward the one wheel.

3. A machine for packing sausages, initially longer than the combined height of a number of cans to be packed therewith, said machine comprising a pair of sprocket wheels mounted for rotation on spaced, horizontal axes; an endless conveyor trained around said wheels; a number of series of spaced, open top holders pivotally mounted on the conveyor and normally disposed in axial alignment with respect to the travel of the conveyor for receiving said sausages; means for continuously driving the wheels to advance the conveyor, holders and sausages carried by the latter; a revolvable, helical knife driven in timed relation with the conveyor thereabove and having its axis inclined horizontally with respect to said travel of the conveyor, said knife being disposed to sever the sausages between the holders as the same advance from one of said wheels toward the other wheel; a spider secured to said other wheel for rotation therewith and having means for receiving said cans to be packed; means for feeding said cans successively to said spider; mechanism adjacent the spider and said other wheel for turning the holders successively as the same commence movement around the one wheel into alignment axially with the cans carried by the spider and transversely of the conveyor; a turret secured to said other wheel for rotation therewith; a plurality of shiftable plungers mounted on the turret; means for successively shifting the plungers into and out of the holders in timed relation with the conveyor to eject the severed sausages therefrom and into the cans; and structure for maintaining the sausages in the holders during severance, said structure including an endless chain driven in timed relation to the conveyor thereabove and having a number of spaced, lateral pressure bars extending across the holders and disposed for successive engagement with the sausages.

4. A machine for packing sausages, initially longer than the combined height of a number of cans to be packed therewith, said machine comprising a pair of sprocket wheels mounted for rotation on spaced, horizontal axes; an endless conveyor trained around said wheels; a number of series of spaced, open top holders pivotally mounted on the conveyor and normally disposed in axial alignment with respect to the travel of the conveyor for receiving said sausages; means for continuously driving the wheels to advance the conveyor, holders and sausages carried by the latter; a revolvable, helical knife driven in timed relation with the conveyor thereabove and having its axis inclined horizontally with respect to said travel of the conveyor, said knife being disposed to sever the sausages between the holders as the same advance from one of said wheels toward the other wheel; a spider secured to said other wheel for rotation therewith and having means for receiving said cans to be packed; means for feeding said cans successively to said spider; mechanism adjacent the spider and said other wheel for turning the holders successively as the same commence movement around the one wheel into alignment axially with the cans carried by the spider and transversely of the conveyor; a turret secured to said other wheel for rotation therewith; a plurality of shiftable plungers mounted on the turret; means for successively shifting the plungers into and out of the holders in timed relation with the conveyor to eject the severed sausages therefrom and into the cans; reindexing means adjacent the one spider and said other wheel for turning the holders into axial alignment successively while the holders are still moving around the other wheel and after the plungers have been retracted from therewithin; and means backing the cans as the same advance in the spider, including a cam edge disposed progressively closer to the spider as the indexing means is approached for shifting the cans over the proximal ends of the severed sausages prior to ejection of the sausages by the plungers.

5. In a machine of the kind described, an endless flexible conveyor having an elongated upper stretch and a lower stretch; spaced sprocket wheels supporting the conveyor; a row of holders rotatably carried by said conveyor and extending outwardly therefrom, the ends of the holders being open and the outermost side of each holder having an entrance opening, said openings being in alignment and said open ends being axially aligned when the holders traverse said upper stretch, adapting the holders to be filled with elongated articles spanning the series thereof; means driven continuously in timed relation with said conveyor for severing the articles between the holders during movement of the articles, presenting a group of short segments of said articles in each holder respectively, said holders being spaced apart whereby the ends of said segments extend beyond said open ends of the holders, said row of holders extending along the line of movement of the conveyor whereby the distance between the holders increases as the holders advance around one of said wheels; indexing means engageable successively with said holders as the same commence to advance around said one wheel for turning the holders to position their axes at right angles to said line of movement of the conveyor; means driven in synchronism with said conveyor for conveying empty cans alongside said one wheel to receive said segments from the holders; a member having an edge engageable with said cans for first shifting the same toward the holders to a position receiving said extended ends of the segments, said edge being disposed progressively closer to the holders in the direction of movement thereof around the one wheel; and means timed with the movement of said conveyor for then ejecting said segments from the holders into the cans during advancement of the holders around said one wheel.

6. In a machine of the kind described, an endless flexible conveyor having an elongated upper stretch and a lower stretch; spaced sprocket wheels supporting the conveyor; a row of spaced holders rotatably carried by said conveyor and extending outwardly therefrom, the ends of the holders being open and the outermost side of each holder having an entrance opening, said openings being in alignment and said open ends being axially aligned when the holders traverse said upper stretch, adapting the holders to be filled with elongated articles spanning the series thereof; means driven continuously in timed relation with said conveyor for severing the articles between the holders during movement of the articles, each holder having pivot means for rotatably attaching the same to the conveyor, said pivot means being so located as to prevent free rotation of the holders at the upper stretch after severance without damaging the cut ends of the articles, said row of holders extending along the line of movement of the conveyor whereby the distance between the holders increases as the holders advance around one of said wheels, thereby clearing said cut ends for free rotation; indexing means engageable successively with said holders when and after the cut ends are cleared for turning the holders to position their axes at right angles to said line of movement of the conveyor; and means synchronized with the movement of the conveyor for successively ejecting the contents of the holders therefrom during advancement thereof around said one wheel.

7. In a canning machine wherein is provided a feeder for advancement of open end cans continuously in procession along an arcuate path of travel with the open ends facing in the same direction for receiving articles to be canned therein, the feeder having means holding the cans in spaced relationship as the same are advanced, the combination with said feeder of a series of open end holders adapted to be filled with elongated articles spanning the series thereof; means supporting said holders for movement toward the cans along a linear path of travel with the open ends of the holders in alignment; pivot means mounting the holders on the supporting means for rotation with respect thereto; means for severing the articles between the holders as the same advance along said linear path of travel, the distance between said open ends of the holders when aligned being relatively close and less than the distance between the open ends of the cans whereby the holders provide maximum support for the articles after severance, necessitating spreading of the holders to align the same with the cans; means for guiding the holder supporting means and the holders along an arcuate path of travel adjacent the feeder whereby the holders spread apart equal to the distance between the cans; means for turning the holders as the same spread apart to align the severed articles with the cans; and means for ejecting the articles from the holders into the cans as the latter and the holders advance around their respective arcuate paths of travel.

8. In a canning machine, a series of open end holders adapted to receive elongated articles spanning the series thereof; means for advancing the holders along a substantially linear path of travel with their open ends in alignment and then along an arcuate path of travel turned approximately ninety degrees; pivot means mounting the holders on the advancing means whereby to permit said turning of the holders, the axes of turning of said holders about said pivot means being substantially radial to the axis of said arcuate path when the holders traverse the latter, there being insufficient spacing between said open ends of the holders while advancing along said linear path to permit said turning; means for severing the articles between the holders while the same advance linearly, said pivot means diverging as the holders traverse the arcuate path of travel, spreading the holders apart; means for turning the holders as and when the same spread apart during advancement along said arcuate path of travel; means for ejecting the articles from the holders after the same have been turned; and means for positioning cans to receive the ejected articles from the holders.

9. The invention as set forth in claim 8, each holder having an entrance opening spanning the distance between the open ends thereof, facing upwardly when the holders advance linearly, permitting laying of the elongated articles thereinto, the pivot means being in opposed relationship thereto and centered between the open ends and the entrance opening whereby after severance the articles are not thrown from the holders by centrifugal force as a consequence of rapid turning of the holders.

10. The invention as set forth in claim 8, and means for moving the cans toward the holders after the latter have been turned and prior to ejection of the articles therefrom for threading the cans over the proximal severed ends of the articles while the latter are confined in the holders.

11. The invention as set forth in claim 9, and a series of held-down elements movable with the holders thereabove in engagement with the articles at said entrance openings to retain the articles during severance, the elements moving out of engagement with the articles after severance and prior to turning of the holders.

12. The invention as set forth in claim 11, and means for moving the cans toward the holders after the latter have been turned and prior to ejection of the articles therefrom for threading the cans over the proximal severed ends of the articles while the latter are confined in the holders.

13. The invention as set forth in claim 8, and a series of article holding elements movable with the holders in engagement with the articles during severance to prevent the articles from moving with respect to each other and with respect to the holders as the same are severed, the elements moving out of engagement with the articles after severance and prior to turning of the holders.

References Cited in the file of this patent

UNITED STATES PATENTS

| | | |
|---|---|---|
| 1,510,729 | Weisner | Oct. 7, 1924 |
| 1,891,830 | Nicholson | Dec. 20, 1932 |
| 1,891,870 | Dodge | Dec. 20, 1932 |
| 2,048,156 | Gardner et al. | July 21, 1936 |
| 2,319,900 | De Back | May 25, 1943 |
| 2,578,833 | Pearson | Dec. 18, 1951 |
| 2,701,674 | Christiansen | Feb. 8, 1955 |